United States Patent
Nakazawa

(10) Patent No.: US 7,070,724 B2
(45) Date of Patent: Jul. 4, 2006

(54) COMPOSITE-MOLDING METHOD AND INJECTION-MOLDING MACHINE OF DIFFERENT MATERIAL RESIN

(75) Inventor: Makoto Nakazawa, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 492 days.

(21) Appl. No.: 10/326,534

(22) Filed: Dec. 19, 2002

(65) Prior Publication Data

US 2003/0116886 A1    Jun. 26, 2003

(30) Foreign Application Priority Data

Dec. 25, 2001  (JP) ............................. 2001-392355

(51) Int. Cl.
  *B29C 45/16* (2006.01)
(52) U.S. Cl. .................. 264/250; 264/247; 264/275; 264/278; 264/328.8; 264/255
(58) Field of Classification Search ................ 264/255, 264/246, 247, 275, 278, 328.8, 250
See application file for complete search history.

(56) References Cited

U.S. PATENT DOCUMENTS

| 5,030,406 | A | * | 7/1991 | Sorensen | 264/255 |
| 5,639,403 | A | * | 6/1997 | Ida et al. | 264/40.1 |
| 5,695,699 | A | * | 12/1997 | Naritomi | 264/46.4 |
| 6,428,732 | B1 | * | 8/2002 | Onoue et al. | 264/278 |

FOREIGN PATENT DOCUMENTS

JP    8-306718    * 11/1996

* cited by examiner

*Primary Examiner*—Edmund H. Lee
(74) *Attorney, Agent, or Firm*—Weingarten, Schurgin, Gagnebin & Lebovici LLP

(57) ABSTRACT

The present invention has an object of eliminating the holding pin trace of a composite-molding of the dichromatic molding by refilling with resin by the pushing pin and preventing the lateral-shift of the primary molding during the refilling. It is made possible to fill closed recess and cavity with resin through a communicating hole formed in the primary molding by the pushing pin. A primary cavity mold 11 and a secondary cavity mold 12 are juxtaposed at symmetrical positions of a fixed plate 1. Core molds 14 closing alternately with both thereof are juxtaposed on a rotary table 7 installed on a movable platen 4. Holding pins 15 of the primary molding 30 and a resin pushing pin 16 are installed in the core mold 14 in a way to appear and disappear in respect to a cavity. The primary molding 30 is held in contact with the surface of the secondary cavity mold by the holding pin 15. A pin hole 20 for refilling resin is formed to be opened on a surface of the core mold by retracting the pushing pin 16. A secondary cavity including the pin hole 20 is refilled with a different material resin by injection. The holding pin 15 is retracted and sunk in the surface of the cavity mold. The pushing pin 16 is moved forward to force the resin for refilling the pin hole 20 into the resin in the cavity. The regions not filled with resin due to the holding pin 15 are refilled up.

4 Claims, 4 Drawing Sheets

COMPOSITE-MOLDING METHOD AND INJECTION-MOLDING MACHINE OF DIFFERENT MATERIAL RESIN

BACKGROUND OF THE INVENTION

1. Field of the Invention

The present invention concerns a molding method and an injection-molding machine for compositing an injection molded primary molding and an injection-molded secondary molding of different material resin by a secondary cavity mold, by transferring rotating the injection-molded primary molding together with a core mold to the secondary cavity mold, and holding in contact with the cavity mold surface by a holding pin.

2. Detailed Description of the Prior Art

For the molding of a composite-molding made of two kinds of material resins different in color or material (called different material resins), a method of inserting a molding molded by another injection machine into a cavity of a mold for molding the product main body and molding integrally by injection, and a so-called dichromatic molding method of molding primarily the portion of character and the main body and then molding secondarily the surrounding of characters with a different material resin are known.

In the insert molding method, a resin refilling space is secured in the cavity by holding the insert by a holding pin. As a result, if the holding pin is extracted after cooling and solidification of the resin, the pin trace remains as a hole on the surface of the molding. This pin trace often constitutes an undesirable defect for a product and, as a solution, the holding pin extraction timing is advanced before the resin solidification, and the refilling of the unfilled region by the holding pin with resin is performed by a secondary injection filling with resin from an injection unit, so that the pin trace may not remain.

However, the insert is only supported by a fluid resin and not fixed, and is in a state to move easily with the resin due to the regressive displacement of the holding pin. Therefore, if the cavity is filled with resin for refilling from the injection unit, the insert shifts out of the set position by moving through the resin pressure in the resin flow direction due to the refilling pressure, i.e., in the counter-gate direction, often making the product inferior.

In the dichromatic method, if the primary mold has characters or numerals in a form having a surrounding area (for example, A, B, P, 8, 9, 0) partially protruding on the top surface thereof, it becomes necessary to dispose a gate at two points or three points of a recess closed by the surrounding area and a cavity, to provide a hot runner for these gate in the mold, making the structure of the secondary cavity mold complex. Moreover, some of small composite products make the molding impossible given the restriction of the gate position.

For a solution means, it may be considered to form a communicating hole in the recess of the primary molding by a projection pin to hold the primary molding in contact with a cavity mold surface by a holding pin, similar to the case of insert molding, and fill both the cavity inside and the recess with resin from a gate of one point through the communicating hole. However, defects due to the holding pin trace or lateral-shift of the primary molding, drawbacks of the aforementioned insert molding, are not resolved.

The present invention, made in order to solve the aforementioned problems of the prior art, has as an object to provide a novel method and an injection-molding machine preventing the primary molding from displacing under the resin pressure during the refilling, and allowing to form a composite-molded product free from defect, by making it possible to fill the closed recess and the cavity with resin through a gate of a single point, even when composite-moldings are formed successively with different material resin by adopting the dichromatic molding method, and refilling portions not filled with resin due to the holding pin by pressing resin by the pushing pin after the injection filling.

SUMMARY OF THE INVENTION

The molding method of the present invention according to the aforementioned object comprises steps of juxtaposing a primary cavity mold and a secondary cavity mold at symmetrical positions of a fixed plate; juxtaposing core molds closing alternately with both of them on a rotary table installed on a movable platen, for transferring a primary molding injection-molded by the primary cavity mold and the core mold to the secondary cavity mold through displacement of the core mold by the rotary table; and composite-molding integrally the primary molding and a secondary molding of different material resin which is injection-molded by the secondary cavity mold, wherein a holding pin for the primary molding and a resin pushing pin are installed in the aforementioned core mold in a way to appear and disappear in respect to a cavity; the primary molding is held in contact with a surface of the secondary cavity mold by the holding pin and a pin hole for refilling the different material resin is formed to be opened on a surface of the core mold by retracting the pushing pin; a secondary cavity including the pin hole is filled with a different material resin by injection before retracting the holding pin to sink in the surface of core mold and, on the other hand, moving the pushing pin forward for pressing the resin for refilling from the pin hole into the resin in the secondary cavity; and refilling regions not filled with resin by retracting the holding pin and wherein a volume of resin for refilling is set greater than or equal to the volume of total unfilled regions.

Another molding method of the present invention comprises steps of forming a communicating hole in a surrounding area by the aforementioned pushing pin, during the formation of a primary molding having indication elements such as characters or numerals protruding partially on the top surface thereof, by the aforementioned primary cavity mold and core mold; filling both the inside of the surrounding area of the primary molding held in contact with the surface of the secondary cavity mold and the secondary cavity with a different material resin by injection through the communicating hold, and exposing the indication elements on a surface of the secondary molding.

Further, the injection-molding machine of the present invention comprises a primary cavity mold and a secondary cavity mold juxtaposed at symmetrical positions of a fixed plate; core mold closing alternately with both of cavity molds juxtaposed on a rotary table of a movable platen side, a clamping cylinder coupling a piston to the movable platen and a driving unit of the rotary table; a pair of injection unit nozzles of different material resin contact with the primary cavity mold and the secondary cavity mold, respectively, wherein a plurality of holding pins for holding the primary molding in contact with a secondary cavity mold surface and a resin pushing pin are installed in the aforementioned core mold in a way to appear and disappear in respect to a cavity and a pin hole for refilling resin by retracting the pushing pin is formed to be opened on a surface of core mold; a driving unit of these pins is installed on the movable platen, and a driving rod is abutted detachably to respective pins through the movable platen and the rotary table.

BRIEF DESCRIPTION OF THE DRAWINGS

These and others and advantages of the present invention will become clear from following description with reference to the accompanying drawing, wherein.

Description of Symbols

| | |
|---|---|
| 1, 2 | Fixed plate |
| 3 | Tie bar |
| 4 | Movable platen |
| 6 | Clamping cylinder |
| 7 | Rotary table |
| 8 | Driving unit of rotary table |
| 9, 10 | Injection unit |
| 11 | Primary cavity mold |
| 12 | Secondary cavity mold |
| 14 | Core mold |
| 15 | Holding pin |
| 16 | Pushing pin |
| 17, 18 | Spring member |
| 20 | Pin hole of resin for refilling |
| 21 | Driving unit of pushing pin |
| 22 | Driving unit of holding pin |
| 23, 24 | Driving rod |
| 30 | Primary molding |
| 31 | Secondary molding |
| 32 | Surrounding area |
| 33 | Recess |
| 34 | Communicating hole |

DETAILED DESCRIPTION OF THE PREFERRED EMBODIMENT

Figure 1:
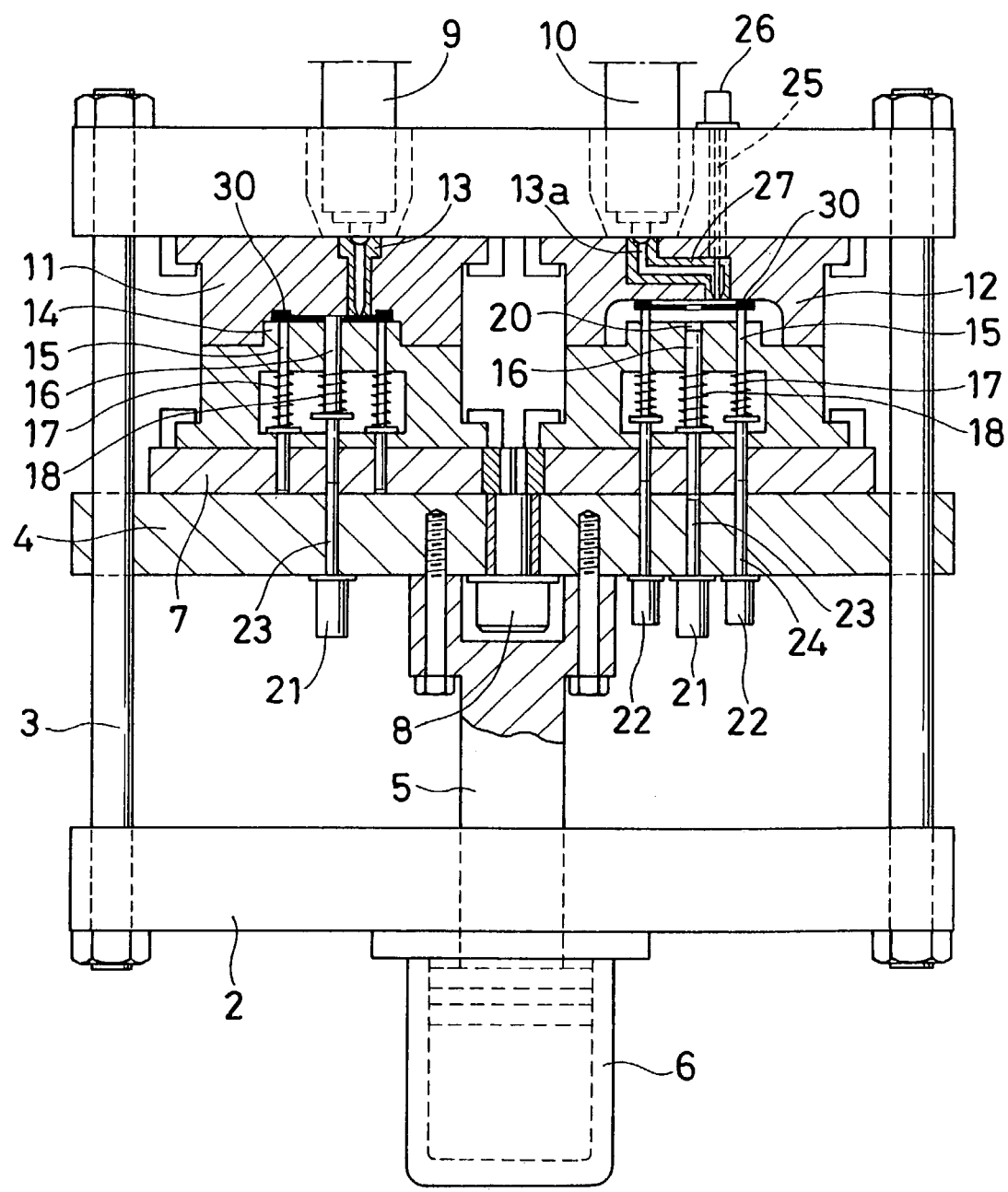
FIG. 1 is a longitudinal face view of an injection-molding machine for composite-molding of different material resin according to the present invention.

FIG. 1 shows one embodiment of an injection-molding machine according to the present invention composed of a vertical type molding machine made by installing a clamping unit comprising opposite fixed plates 1, 2 coupled by tie bars 3, 3, a movable platen 4 extending through the tie bars 3, 3 and supported by them, a clamping cylinder 6 affixed to the fixed plate 2 by coupling a piston 5 with the movable platen 4 at its outside center, a rotary table 7 installed rotating at the inside center of the movable platen 4, and a rotation driving unit 8 such as a hydraulic or electric motor, installed in a piston coupling area at the outside center of the movable platen 4 and connected to the rotary table 7, on a bedplate (—not shown), with the clamping cylinder side downward, and installing a pair of injection units 9, 10 downwards on an upper portion of the fixed plate 1.

A primary cavity mold 11 and a secondary cavity mold 12 different in cavity shape are juxtaposed at symmetrical positions of the aforementioned fixed plate 1. A pair of core molds 14, 14 of a same structure closing alternately with both cavity molds 11, 12 is juxtaposed on the aforementioned rotary table 7, and it is so composed that a primary molding 30 is molded by the core mold 14 and the primary cavity mold 11 and a secondary molding 31 becoming the product main body by the secondary cavity mold 12 and the core mold 14 (refer to FIG. 3) with resins of different material injection refilled into respective cavities from the aforementioned injection unit 9, 10 the nozzles of which touch a spool bush 13 and a hot runner 13a.

A pair of right and left holding pins 15, 15 and a central pushing pin 16 are installed in the aforementioned core mold 14 which are always biased by spring members 17, 18 in the regressive direction and capable of appearing and disappearing with respect to the cavity, and it is so composed that a pin hole 20 of resin for refilling is formed to be opened in a core mold surface by the regression of the pushing pin 16.

A driving unit 21 of the pushing pin 16 is installed at primary side and secondary side stop positions of the core mold 14 of the aforementioned movable platen 7 and a driving unit 22 of the holding pin 15 at the secondary side stop position in a detachable manner, each driving unit abutted to each respective pin by inserting driving rods 23, 24 into through-holes perforated in the movable platen 4 and the rotary table 7, and respective pin protrudes into the cavity or sinks in the core mold by hydraulic forward and backward motion of the driving rods 23, 24 and the spring members 17, 18.

The aforementioned primary mold 30 may be any of alphanumeric characters of a shape having a surrounding area (for example, A, B, P, 8, 9, 0), alphanumeric characters of a shape without surrounding area (for example, E, F, H, 2, 3, 7), sign-board, color plate, or others, and essentially all of molds compounded in a state buried in the surface side of a product main body formed as a secondary molding 31 are included.

Figure 2:
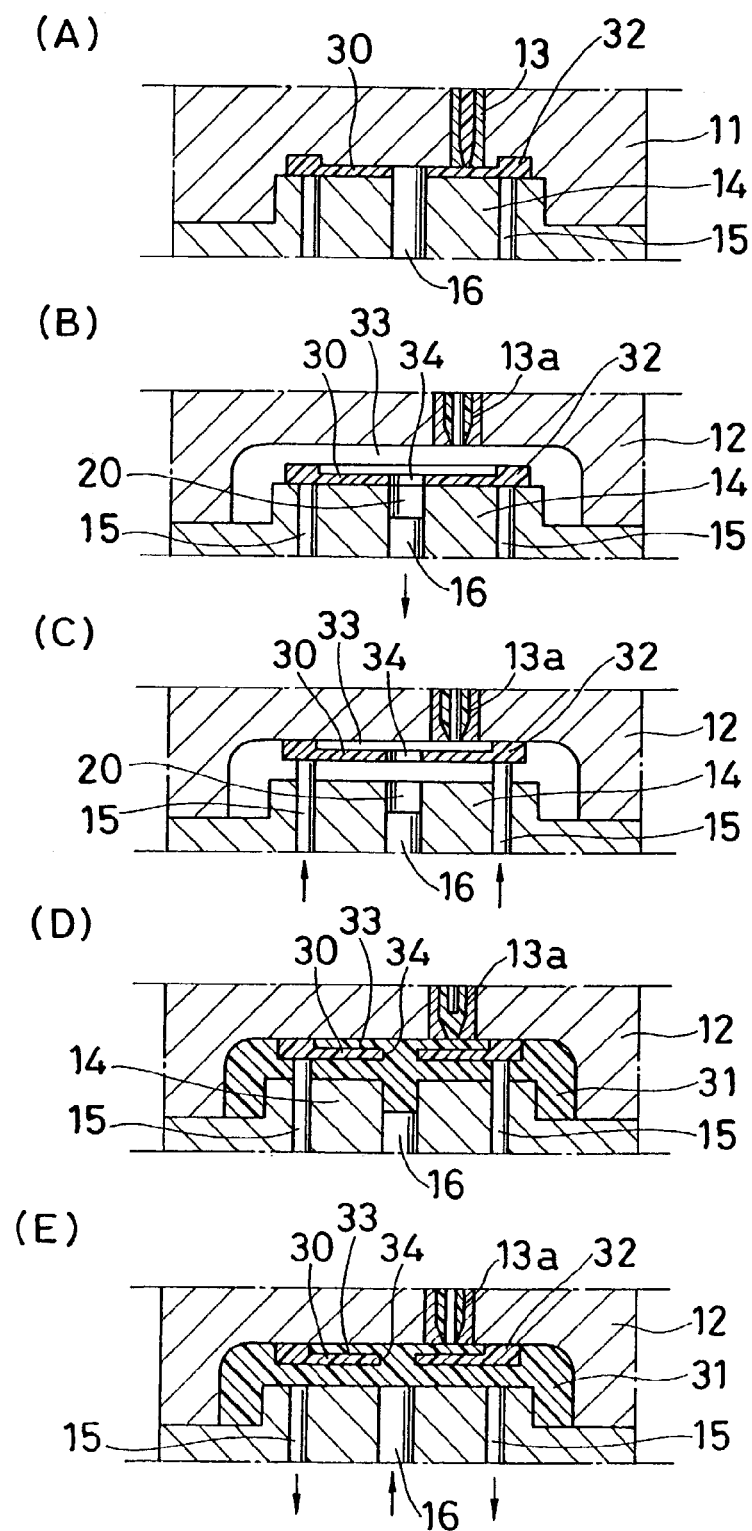
FIG. 2 illustrates steps of a composite-molding method of different material resin according to the present invention.
Figure 4:
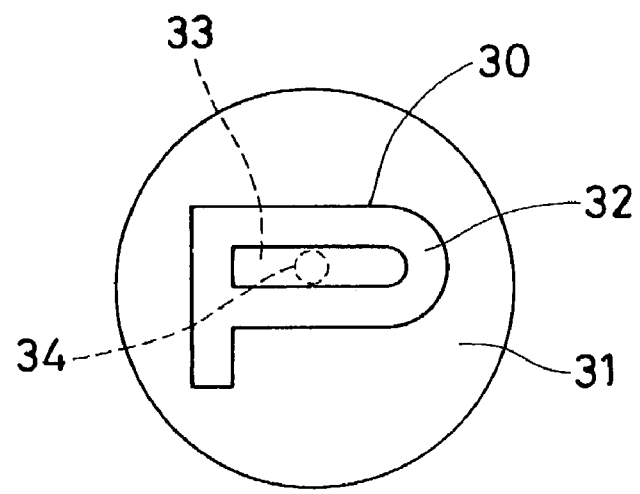
FIG. 4 is a plan of a composite product of different material resin.

Now, the composite-molding by the aforementioned injection-molding machine shall be described in accordance with molding steps shown in FIG. 2 (A) to (E). The molding steps is the one showing an embodiment in case of taking a plate body having an indication element of an alphabetic character P having a surrounding area 32 shown in FIG. 4 as primary molding 30 and composite-molding and exposing the alphabetic character P on a top face of a cap-like product main body which is molded by injection as secondary molding 31.

First, the movable platen 4 is moved up by the hydraulic operation of the clamping cylinder 6 for closing the primary cavity mold 11 and the core mold 14 and the secondary cavity mold 12 and the core mold 14. Next, the driving unit 21 is operated by hydraulic on the primary cavity mold side, for projecting the pushing pin 16 into the cavity against the spring pressure.

It should be noted that, in case of a primary molding 30 without surrounding area such as the alphabetic letter H, the projection of the pushing pin 16 shall be limited to the mold face of the core mold 14, and a through-hole 34 mentioned below shall not be formed by the pushing pin 16.

The driving unit 24 is operated by hydraulic on the secondary cavity mold side, for projecting the holding pin 15, 15 into the cavity, the primary molding 30 injection-molded on the primary cavity mold side is abutted to the cavity mold surface and kept in the state. Next, the molds are clamped in order to fill resins of respectively different materials into the cavity by injection from the injection unit 9, 10.

In the primary cavity mold, a primary molding 30 having a communicating hole 34 is injection-molded, on the plate face of a recess 33 closed with the surrounding area 32, by the pushing pin 16 protruding in the cavity. Also, in the secondary cavity mold, the recess 33 is filled with a resin of a material different from the primary molding 30 from a gate facing the aforementioned recess 33 and, at the same time, a cavity 12a and a pin hole 20 of resin for refilling are filled from the through hole 34, for molding a secondary molding 31 constituting the product main body, and obtaining a composite-mold having a character P appearing on the top face by integrally compounding with the primary molding 30.

After the end of injection filling of resin, the projection of the pushing pin 16 by the driving unit 21 is released on the primary cavity mold side, thereby the pushing pin 16 is pushed back by the spring pressure, and a pin hole 20 formed to be opened on the core mold surface. Besides, on the secondary cavity mold side, the projection of the holding pins 15, 15 by the driving unit 22 is released while the resin is still fluid, and simultaneously, the pushing pin 16 is projected by the driving unit 21. Upon release of projection, the holding pins 15, 15 retracts up to the core mold face by the spring pressure, and the pushing pin 16 pushes out resin for refilling charged into the pin hole 20 into the resin of the cavity.

At this moment, as the injection pressure is in a state higher than the cavity inner pressure at the end of refilling, if the holding pins 15, 15 retracts to the core mold face as it is, the injection unit side resin flows from the gate into the cavity side by the pressure difference, burring unfilled regions before the resin for refilling and, at the same time, resin flow is provoked in the cavity, turning out into the lateral-shift of the primary molding 30.

There, the injection pressure is lowered to the vicinity of the cavity inner pressure, for preventing the resin 21 from flowing out of the injection unit side into the cavity, before moving the holding pins 15, 15 backward and the pushing pin 16 forward, by operating simultaneously respective driving units 21, 22. Thereby, the resin for refilling the pin hole 20 is pressed into the resin in the cavity.

The resin pressure due to this pushing pressure abuts to the primary molding 30 from the cavity mold surface, divides itself right and left and pushes resin in the cavity to unfilled regions at both ends. This eliminates the lateral-shift of the primary molding 30 due to the pushing of resin after the release of holding, into the unfilled regions in the secondary molding 31 are filled up securely along with the backward motion of the holding pins 15, 15, and the pin trace shall be refilled up completely.

Thereafter, the mold is opened by the regression of the movable platen 4, the composite-molding is released from the mold at the opening position by another projection by the holding pins 15, 15, then the rotary table 7 is rotated by 180° by the driving unit 8, and the primary molding 30 is transferred to the opening position with the secondary cavity mold 12. This turns up to be the next injection step.

Figure 3:
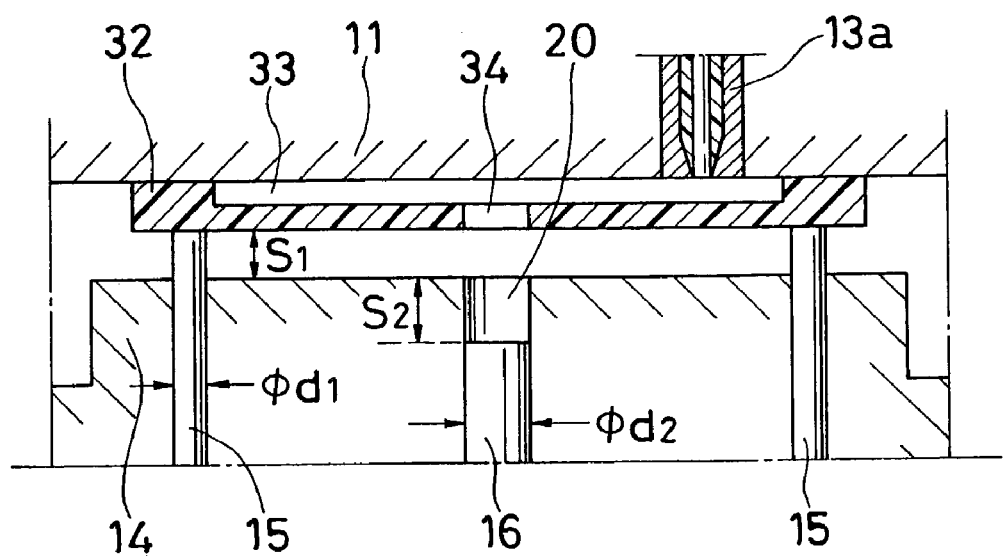
FIG. 3 is a volume calculation diagram of refilling resin.

Given the volume of unfilled regions of resin per holding pin, $$\pi/4 d_1^2 \times S_1$$

where, $d_1$ is the diameter of the holding pin, and $S_1$ is the projection length of holding pin;
and the volume of a single pin hole from FIG. 3, $$\pi/4 d_2^2 \times S_2$$

where $d_2$ is the diameter of the pin hole, and $S_2$ is the depth of the pin hole, the quantity of resin for refilling by the aforementioned pin hole 20 may be set to $$(\pi/4 d_2^2 \times S_2) \times 1 \geq (\pi/4 d_1^2 \times S_1) \times 2$$

in case of two holding pins and a single pin hole as shown in the drawing; allowing to refill unfilled regions with resin sufficiently.

Further, except for the pressure control, a valve gate provided with an open-close pin 25 shown in FIG. 1 may also be adopted for preventing resin from flowing in after the end of injection filling, and closed by moving the open-close pin 25 forward by the hydraulic cylinder 26 after the injection filling with resin, in a way to prevent resin of the hot runner 27 from flowing in the cavity side, before filling the unfilled regions by a relative operation of the hot runner and the pushing pin 16.

Figure 5:
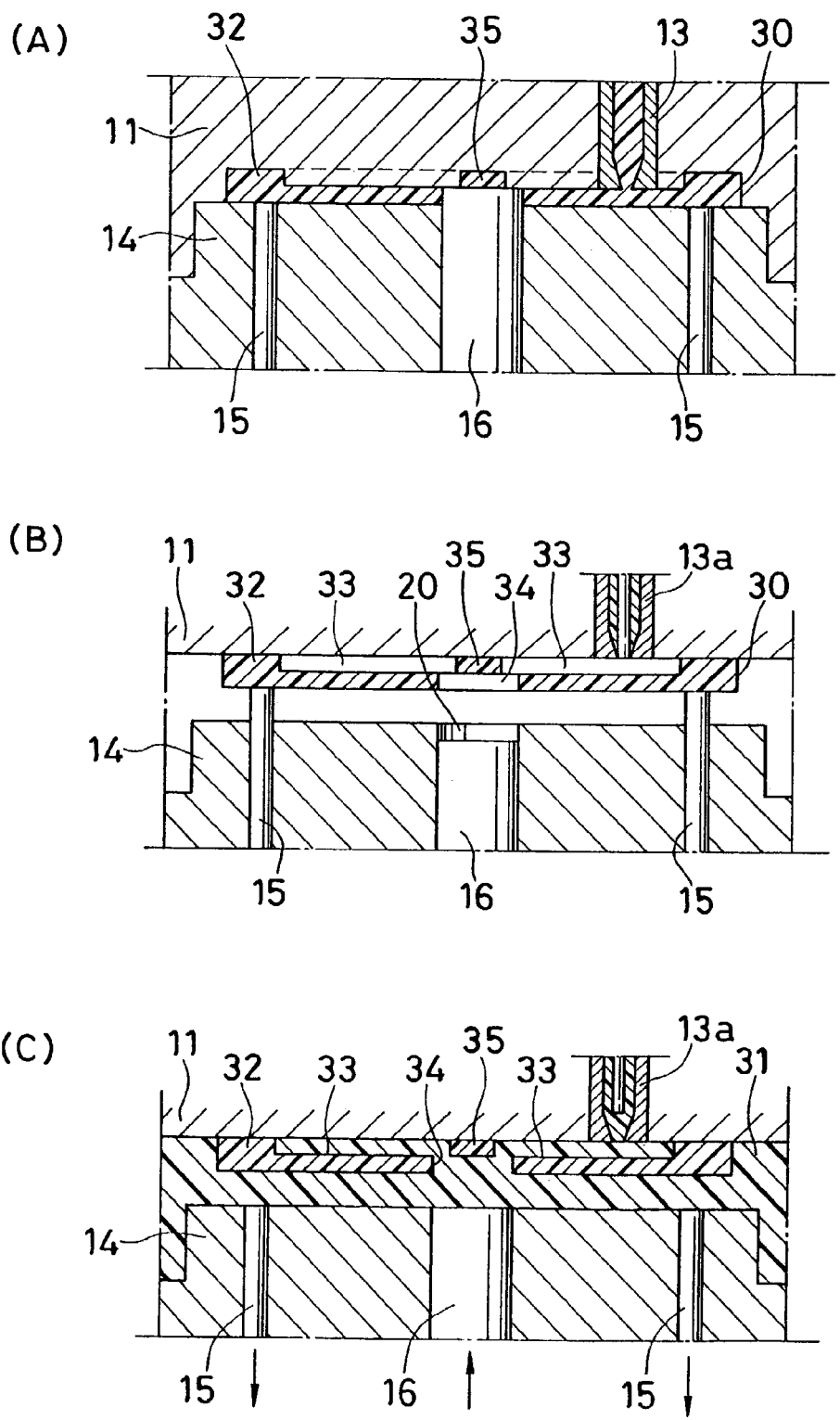
FIG. 5 illustrates steps of a composite-molding method of another embodiment according to the present invention.

FIGS. 5(A) to (C) show the molding step in case where a recess 33 formed by the surrounding area 32 in the primary molding 30 is further divided into two by a central partition 35 as the indication element of an alphabetic character B. For such primary molding 30, the pushing pin 16 may be formed with a large diameter, and a communicating hole 34 as shown in FIG. 5(B) opening in both recesses 33, 33 separated by the partition 35 may enough be formed by the pushing pin 16. Resin which is injection filled through such communicating hole 34 flows in the cavity and both recesses 33, 33, molds the secondary molding 31 turning up to be the product main body and, at the same time, compounds integrally with the primary molding 30 and constitutes a composite-molding exposing the alphabetic character B on the top face.

Though omitted in the drawing, in case of a plate-like primary molding 30 without closed recess, it becomes unnecessary to mold a communicating hole by the pushing pin, and the pushing pin acts exclusively as a pin for forming and refilling the pin hole of resin for refilling in the secondary cavity mold.

While the presently preferred embodiment of the present invention has been shown and described, it will be understood that the present invention is not limited thereto, and that various changes and modification may be made by those skilled in the art without departing from the scope of the invention as set forth in the appended claims.

What is claimed is:

1. A composite-molding method of different material resins, comprising the steps of:
   juxtaposing a primary cavity mold and a secondary cavity mold at symmetrical positions of a fixed plate;
   juxtaposing core molds closing alternately with both the primary cavity mold and the secondary cavity mold on a rotary table installed on a movable platen, for transferring a primary molding which is injection-molded by the primary cavity mold and the core mold to the secondary cavity mold through displacement of the core mold by the rotary table;
   installing a holding pin for the primary molding and a resin pushing pin in said core mold in a way to appear and disappear with respect to a cavity of the primary cavity mold and secondary cavity mold, when composite-molding integrally by the second cavity mold the primary molding and a secondary molding of different material resin which is injection-molded;
   injection molding a primary molding;
   holding the primary molding in contact with a surface of the secondary cavity mold by the holding pin and forming a pin hole to be opened on a surface of the core mold for refilling the different material resin by retracting the pushing pin;

injecting and refilling with the different material resin into the secondary cavity including the pin hole, retracting the holding pin to sink in the surface of core mold and moving the pushing pin forward to press the resin for refilling from the pin hole into the resin in the secondary cavity;

and refilling with the resin an unfilled region formed by retracting the holding pin.

2. The composite-molding method of different material resins of claim 1, wherein: a volume of resin for refilling is set greater than or equal to a volume of total unfilled regions.

3. The composite-molding method of different material resins of claim 1, wherein:

during the formation of a primary molding having indication elements, a form having a surrounding area, protruding partially on the top surface thereof, by said primary cavity mold and core mold, forming a communicating hole in the surrounding area by said pushing pin, injecting and filling the different material resin through the communicating hole into both the inside of the surrounding area of the primary molding held in contact with the secondary cavity mold surface and the second cavity mold;

and exposing the indication elements on a surface of the secondary molding.

4. The composite-molding method of different material resins of claim 2, wherein:

during the formation of a primary molding having indication elements, a form having a surrounding area, protruding partially on the top surface thereof, by said primary cavity mold and core mold, forming a communicating hole in the surrounding area by said pushing pin, injecting and filling the different material resin through the communicating hole into both the inside of the surrounding area of the primary molding held in contact with the secondary cavity mold surface and the second cavity mold;

and exposing the indication elements on a surface of the secondary molding.

* * * * *

UNITED STATES PATENT AND TRADEMARK OFFICE
CERTIFICATE OF CORRECTION

| | | |
|---|---|---|
| PATENT NO. | : 7,070,724 B2 | Page 1 of 1 |
| APPLICATION NO. | : 10/326534 | |
| DATED | : July 4, 2006 | |
| INVENTOR(S) | : Makoto Nakazawa | |

It is certified that error appears in the above-identified patent and that said Letters Patent is hereby corrected as shown below:

Column 2, line 60, "resin contact" should read --resin in contact-- .

Signed and Sealed this

Fifteenth Day of May, 2007

JON W. DUDAS
*Director of the United States Patent and Trademark Office*